(12) United States Patent
Wang et al.

(10) Patent No.: US 11,290,582 B2
(45) Date of Patent: Mar. 29, 2022

(54) MOBILE TERMINAL AND METHOD FOR OPTIMIZING PERFORMANCE OF AN ANTENNA MODULE THEREOF

(71) Applicant: AAC Technologies Pte. Ltd., Singapore (SG)

(72) Inventors: Chao Wang, Shenzhen (CN); Zhiqiang Zhuang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/993,253

(22) Filed: Aug. 13, 2020

(65) Prior Publication Data
US 2020/0412849 A1 Dec. 31, 2020

Related U.S. Application Data

(63) Continuation of application No. PCT/CN2019/094095, filed on Jun. 30, 2019.

(51) Int. Cl.
*H04M 1/02* (2006.01)
*H01Q 1/24* (2006.01)

(52) U.S. Cl.
CPC ............ *H04M 1/026* (2013.01); *H01Q 1/241* (2013.01)

(58) Field of Classification Search
CPC ............................... H04M 1/026; H01Q 1/241
See application file for complete search history.

(56) References Cited

U.S. PATENT DOCUMENTS

2018/0026341 A1\* 1/2018 Mow ...................... H04B 10/90
343/702

FOREIGN PATENT DOCUMENTS

| CN | 108376828 A1 | | 8/2018 |
| CN | 108550979 A | * | 9/2018 |
| CN | 108550979 A1 | | 9/2018 |
| CN | 109546295 A | * | 3/2019 |
| CN | 109546295 A1 | | 3/2019 |

OTHER PUBLICATIONS

1st Office Action dated Jun. 1, 2020 by SIPO in related Chinese Patent Application No. 201910596808.3(8 Pages).
2nd Office Action dated Feb. 9, 2021 by SIPO in related Chinese Patent Application No. 201910596808.3(6 Pages).
PCT search report dated Mar. 26, 2020 by SIPO in related PCT Patent Application No. PCT/CN2019/094095 (4 Pages).

\* cited by examiner

*Primary Examiner* — Ankur Jain
*Assistant Examiner* — Angelica M Perez
(74) *Attorney, Agent, or Firm* — W&G Law Group

(57) ABSTRACT

A mobile terminal includes a display screen, an internal support unit, an antenna module and a rear shell. The display screen cooperates with the rear shell to form a cavity therebetween. The internal support unit is located in the cavity for fixing and supporting components. The antenna module is located in the cavity and at a position close to a sidewall of the rear shell, and is fixed and supported by the internal support unit. The internal support unit defines a through hole to form a unobstructed signal channel between the antenna module and the side of the internal support unit closest to the rear shell, optimizing a performance of the antenna module, realizing a broadband phased array module with better spatial coverage in a limited space, optimizing the direction of the antenna module, improving the gain and coverage of the antenna module, and optimizing the CDF index.

13 Claims, 15 Drawing Sheets

MOBILE TERMINAL AND METHOD FOR OPTIMIZING PERFORMANCE OF AN ANTENNA MODULE THEREOF

FIELD OF THE INVENTION

The present disclosure relates to the field of communication technology, and in particular, to a mobile terminal and a method for optimizing a performance of an antenna module thereof.

BACKGROUND OF THE INVENTION 5G (5th Generation Mobile Networks) has become R&D focus of the global industry. It has become a consensus in the industry to develop 5G technology and develop 5G standards. At the 22nd conference of ITU-RWP5D held in June 2015, ITU (International Telecommunication Union) specified that there are three main application scenarios for 5G: enhanced mobile broadband, large-scale machine communication, and high reliability low-latency communication. The three application scenarios correspond to different key indicators of 5G, in which, in the enhanced mobile broadband scenario, the peak speed of users is 20 Gbps, and the minimum experience speed of users is 100 Mbps. 3GPP is standardizing 5G technology, the first 5G NSA (Non-Stand Alone) international standard was formally completed in December 2017, and the 5G NA (Stand Alone) standard was completed on Jun. 14, 2018.

Tremendous bandwidth sources of the millimeter-wave band provide a guarantee for high speed transmission, but a wireless communication system utilizing the millimeter-wave band needs to adopt a phased array infrastructure due to the violent space loss of electromagnetic waves in this band. As an indispensable component in a RF front-end system, Antenna is integrated and packaged with the RF front-end circuit when the RF circuit is developing towards integration and miniaturization, which is an inevitable trend for the future development of the RF front-end.

AiP (Antenna-in-Package) technology is to integrate the antenna into a package that carries a chip through packaging materials and processes, which takes into account the performance, cost and volume of the antenna, and is favored by majority of chip and package manufacturers. Currently, Qualcomm, Intel, IBM and etc. have adopted AiP technology. Needless to say, AiP technology will also provide a good antenna solution for 5G millimeter-wave mobile communication systems.

For the 5G millimeter-wave band, 3GPP has developed several standard working bands as n257 (26.5 GHz-29.5 GHz), n258 (24.25-27.5 GHz), n260 (37-40 GHZ), and n261 (27.5-28.35 GHZ). In a limited space of an antenna, it is a challenge to realize a broadband phased array module with better spatial coverage in a fixed laminated structure.

Therefore, it is necessary to provide a mobile terminal with a broadband phased array module which realizes better spatial coverage of millimeter-wave in a limited space.

SUMMARY OF THE INVENTION

An object of the present disclosure is to provide a mobile terminal and a method for optimizing a performance of an antenna module thereof, for solving the technical problem that it is a challenge to realize a broadband phased array module with better spatial coverage in a fixed laminated structure in a limited space.

The technical solution of the present disclosure is as follows:

In one aspect, the present disclosure provides a mobile terminal, including a display screen, an internal support unit, an antenna module and a rear shell, the display screen cooperating with the rear shell to form a cavity therebetween, the internal support unit being located in the cavity for fixing and supporting components of the mobile terminal, the antenna module being located in the cavity and at a position close to a lateral wall of the rear shell and being fixed and supported by the internal support unit, the internal support unit defining a through hole to form an unobstructed signal channel between the antenna module and a side of the internal support unit closest to the rear shell.

As an improvement, the antenna module comprises at least one antenna unit, and the through hole and the signal channel correspond to the antenna unit one to one.

As an improvement, the antenna module comprises a plurality of antenna units, the internal support unit defines a plurality of through holes to form a plurality of signal channels, each of the antenna units corresponds to one of the signal channels, and the internal support unit forms a protrusion between neighboring signal channels.

As an improvement, a line connecting the center point of the through hole and the center point of the antenna unit is perpendicular to the antenna unit.

As an improvement, a shape of the through hole is one of rectangle, square, and circle.

As an improvement, the internal support unit is made of plastic.

As an improvement, the internal support unit is manufactured by injection molding or 3D printing.

As an improvement, the signal channel is hollow and not filled with any filler.

As an improvement, the rear shell is made of 3D glass.

In another aspect, the present disclosure provides a method for optimizing a performance of an antenna module of a mobile terminal, the mobile terminal further comprising a display screen, a rear shell, an internal support unit, and the antenna module, the method comprising steps: defining a through hole in the internal support unit between the antenna module and a side of the internal support unit closest to the rear shell; and forming an unobstructed signal channel between the antenna module and the side closest to the rear shell by the through hole, optimizing the performance of the antenna module.

The present disclosure has the advantages that: the internal support unit of the present disclosure defines the through hole to form the unobstructed signal channel between the antenna module and the side closest to the rear shell, thus to optimize a performance of the antenna module of the mobile terminal, thereby realizing a broadband phased array module with better spatial coverage in a limited space, optimizing the direction of the antenna module, improving the gain and coverage of the antenna module, and optimizing the CDF index.

DETAILED DESCRIPTION OF THE PREFERRED EMBODIMENTS

Figure 1:
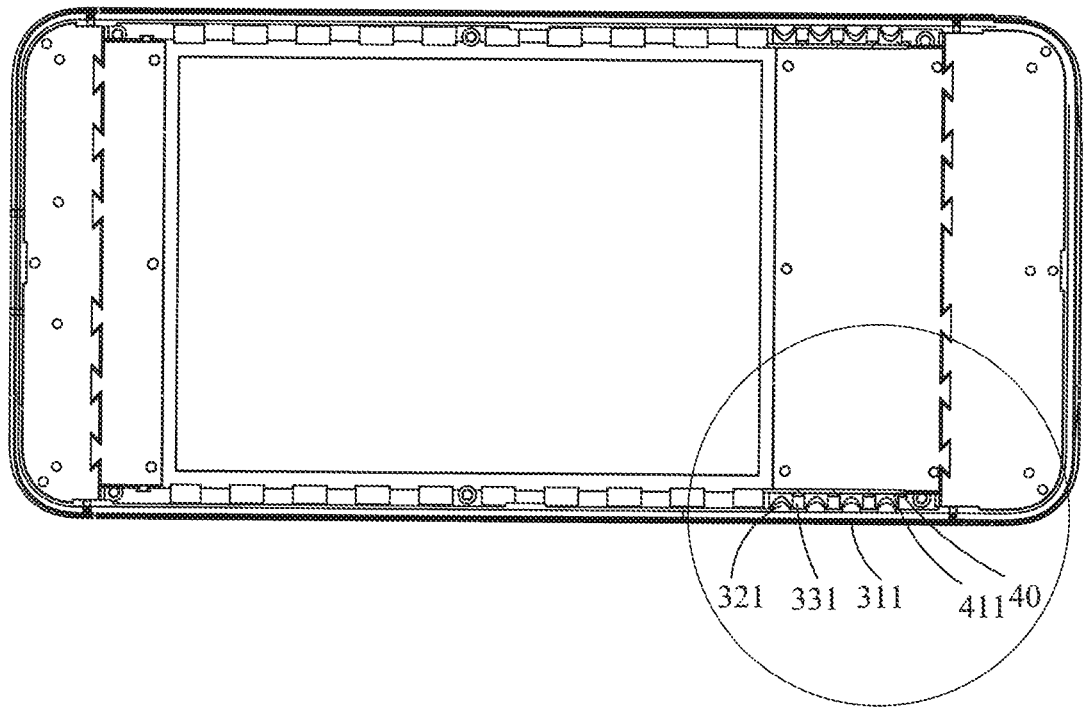
FIG. 1 is a schematic, structural diagram of parts of a mobile terminal of the present disclosure.
Figure 2:
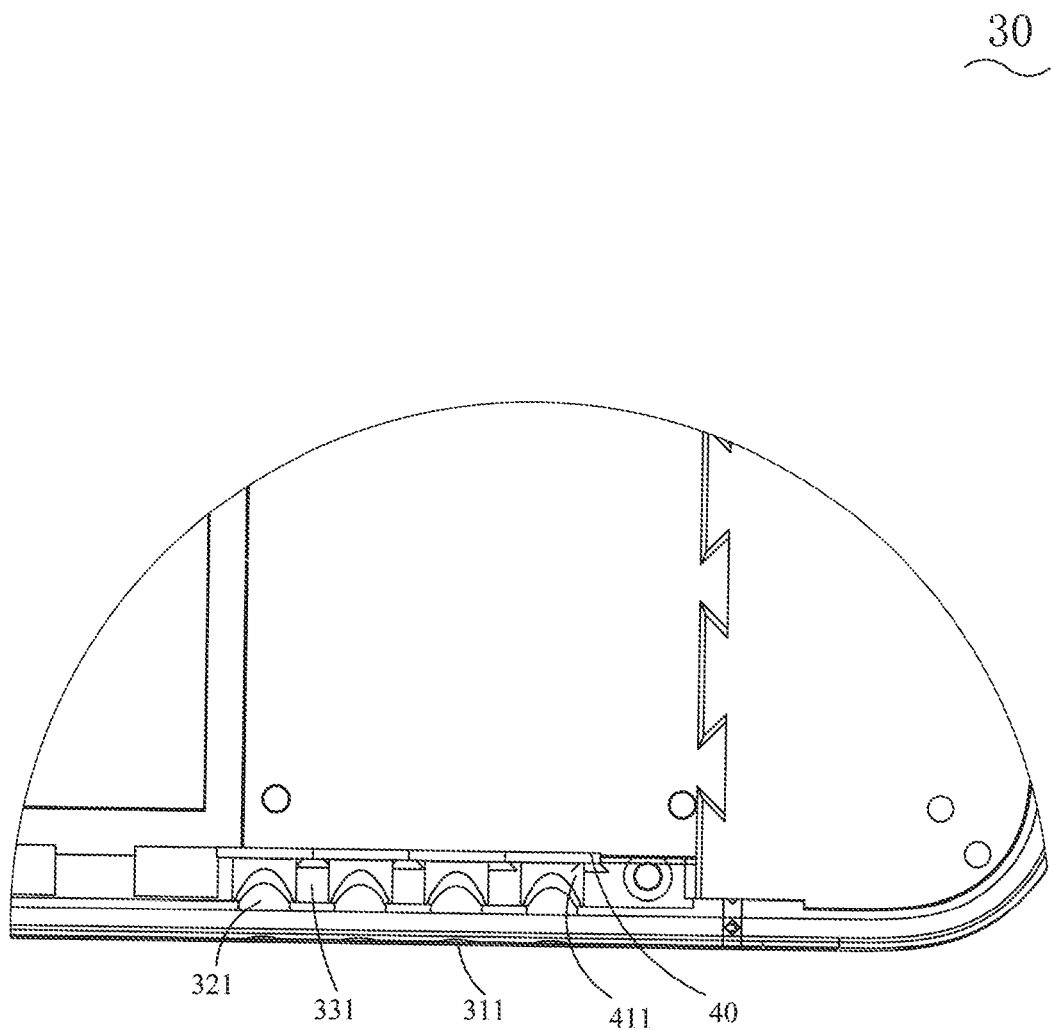
FIG. 2 is an enlarged view of a circled portion of FIG. 1.

The present disclosure will be further described below with reference to the drawings and embodiments.

Referring to FIG. 1 to FIG. 12, the present disclosure provides a mobile terminal 100 which includes a display screen 20, an internal support unit 30, an antenna module 40 and a rear shell 50. The display screen 20 cooperates with the rear shell 50 to form a cavity therebetween. The internal support unit 30 is located in the cavity, for fixing and supporting components of the mobile terminal 100. The antenna module 40 is located in the cavity and at a position close to a lateral side of the rear shell 50. The antenna module 40 is fixedly supported by the internal support unit 30. It can be understood that the mobile terminal 100 further includes other traditional components, such as battery, camera, motherboard, etc. in order to achieve other functions of the mobile terminal 100, the description of which is omitted here.

The display screen 20 is configured to input and output signals of the mobile terminal 100. The display screen 20 can be a TFT liquid crystal display screen 20, a UFB liquid crystal display screen 20, an STN screen, an AMOLED, etc., which is not specifically limited herein.

The rear shell 50 is configured to package the rear and lateral sides of the mobile terminal 100 to protect the components inside the mobile terminal 100. The rear shell 50 includes a lateral wall 511 and a rear wall 521. When the rear wall 521 is rectangle or square, the number of the lateral walls 511 is four. The four lateral walls 511 are located at four edges of the rear wall 521, respectively, and are located at the same side of the rear wall 521, so that the rear shell 50 forms a chamber with an opening opposite to the rear wall 521. When the rear wall 521 has other shapes, such as circle or ellipse, the lateral wall 511 extending from the peripheral edge of the rear wall 521 has a ring shape and the cross-section of the lateral wall 511 has the same shape as the rear wall 521. It can be understood that the rear shell 50 is integrally formed, thereby improving an accuracy of the shape of the rear shell 50. In other embodiments, the rear shell 50 may also be divided into multiple sections, and the multiple sections are manufactured separately and then assembled to form the rear shell 50 which can package the rear and lateral sides of the mobile terminal 100 to protect the components inside the mobile terminal 100.

In a preferred embodiment of the present disclosure, rounding is performed, for example, at an angle of 45°, at a connection between the lateral wall 511 and the rear wall 521, thereby reducing wear on the connection between the lateral wall 511 and rear wall 521, and improving the user experience.

Referring to FIG. 1 to FIG. 11, the internal support unit 30 defines a through hole 311 to form an unobstructed signal channel 321 between the antenna module 40 and a side of the internal support unit 30 closest to the rear shell 50. By providing the through hole 311, a structure of the internal support unit 30 is optimized to improve a performance of the antenna module 40 of the mobile terminal 100, thereby realizing a broadband phased array module with better spatial coverage in a limited space, optimizing the direction of the antenna module 40, improving the gain and coverage of the antenna module 40, and optimizing the CDF (Cumulative Distribution Function) index.

Referring to FIG. 3 to FIG. 11, the shape of the through hole 311 may be any one of rectangle, square, and circle. It can be understood that the through hole 311 may also have other shapes, which is not specifically limited herein.

In a preferred embodiment of the present disclosure, the antenna module 40 includes at least one antenna unit 411. The through hole 311 and the signal channel 321 correspond to the antenna unit 411 one to one, thereby ensuring the stability of transmitting and receiving signals of each antenna unit 411, and improving the quality of transmitting and receiving signals of the antenna module 40. It can be understood that, in another embodiment, one through hole 311 and one signal channel 321 correspond to multi antenna units 411, or, multi through holes 311 and multi signal channels 321 correspond to multi antenna units 411.

The antenna module 40 includes a substrate, at least one antenna unit 411, an IC chip, and a circuitry. The antenna unit 411 is arranged on the substrate, the IC chip is located at a side of the substrate away from the antenna unit 411, and the circuitry is formed inside the substrate and electrically connected to the antenna unit 411 and the IC chip. When the antenna module 40 includes a plurality of antenna units 411, the antenna module 40 further includes an isolation component. The isolation component is located between two neighboring antenna units 411 to separate the two neighboring antenna units 411. It can be understood that the antenna module 40 may also have other structures, which is not specifically limited herein.

In a preferred embodiment of the present disclosure, the antenna module 40 is configured for transmitting and receiving millimeter-wave signals. It can be understood that the antenna module 40 may also transmit and receive signals in other bands, which is not specifically limited herein.

The antenna module 40 is parallel to a long side of the mobile terminal 100, and most of the signals transmitted and received by the antenna module 40 pass through the long side of the mobile terminal 100. A user usually holds the mobile terminal 100 with a bottom short side of the mobile terminal 100 on the palm and fingers on two long sides of the mobile terminal 100, thereby preventing the mobile terminal 100 from falling off the handle and damaging when the mobile terminal 100 is held in hand. In this embodiment, the antenna module 40 is close to a top short side of the mobile terminal 100 opposite to the bottom short side, thereby preventing the fingers of the user from affecting the antenna module 40 to transmit and receive signals when the mobile terminal 100 is held in hand, and improving the quality and stability of transmitting and receiving signals of the antenna module 40. It can be understood that the antenna module 40 may also be placed at other positions of the mobile terminal 100, which is not specifically limited herein.

Referring to FIG. 1, in a preferred embodiment of the present disclosure, there are two antenna modules 40 which are arranged symmetrically about a long axis of the mobile terminal 100. The two antenna modules 40 can transmit and receive signals in the same band, thereby ensuring the stability of transmitting and receiving signals of the mobile terminal 100. Alternatively, the two antenna modules 40 can transmit and receive signals in different bands, thereby improving a range of an operating band of the mobile terminal 100.

In a preferred embodiment of the present disclosure, there can be multi antenna modules 40 which can be arranged in different positions of the cavity, making the mobile terminal 100 adapt to different application scenarios.

Figure 11:
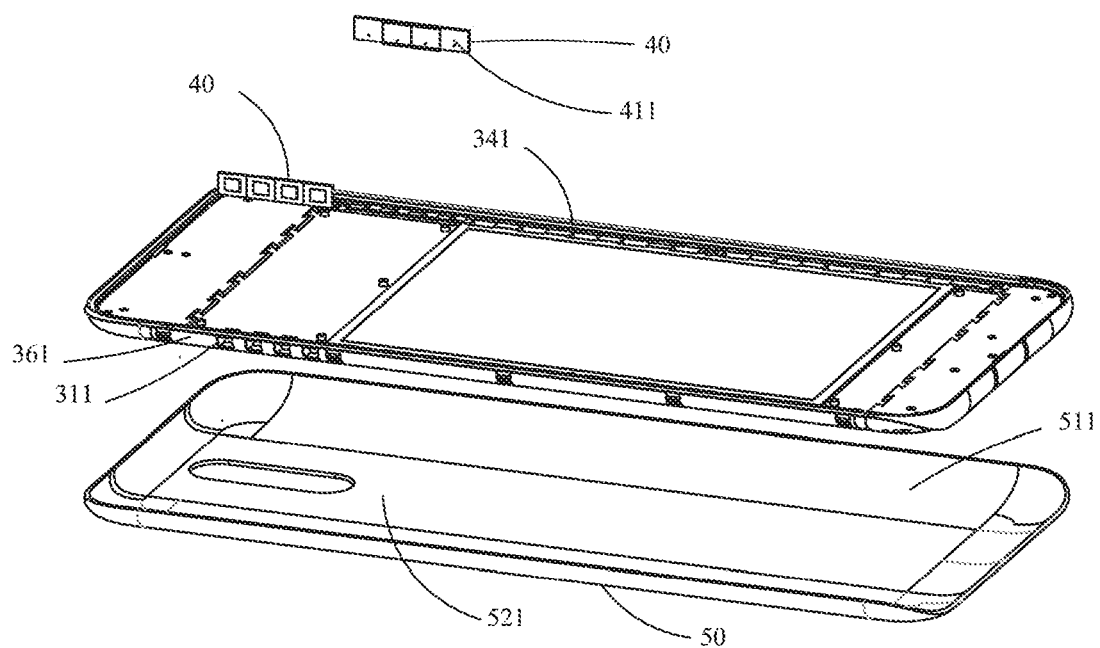
FIG. 11 is an exploded view of parts of the mobile terminal of the present disclosure.
Figure 12:
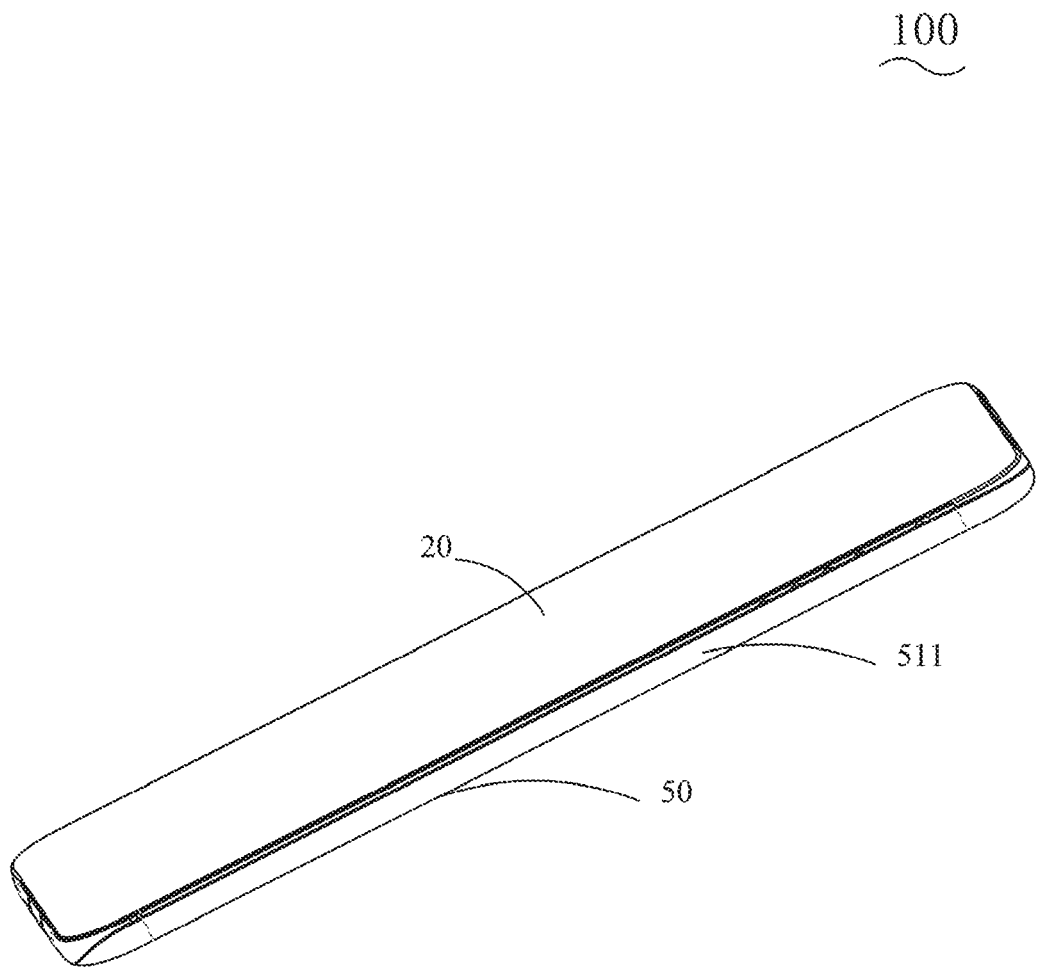
FIG. 12 is a schematic diagram of the mobile terminal of the present disclosure.

In a preferred embodiment of the present disclosure, the antenna module 40 includes a plurality of antenna units 411, and each antenna unit 411 corresponds to one of the signal channels 321. The internal support unit 30 forms a protrusion 331 between two neighboring signal channels 321. The protrusions 331 extend toward the display screen which facilitates the internal support unit 30 to provide better support for the display screen 20 and the rear shell 50. As shown in FIG. 1 and FIG. 11, the mobile terminal 100 includes two antenna modules 40, and each antenna module 40 includes four antenna units 411.

The protrusion 331 is formed by a part of the internal support unit 30 protruding from a position close the rear shell 50 towards the display screen 20 of the mobile terminal 100. A height of the protrusion 331 is configured that a top surface of the protrusion 331 does not contact the display screen 20 of the mobile terminal 100 when the mobile terminal 100 is in normal use. It can be understood that the protrusion 331 may have other heights, which is not specifically limited herein. A shape of the protrusion 331 is designed according to setup requirements of the internal support unit 30 and signal channel 321, and is not specifically limited herein.

In a preferred embodiment of the present disclosure, the top surface of the protrusion 331 is covered with a layer of flexible material, such as rubber, soft rubber, etc. The flexible material has a buffering function, thereby protecting the display screen 20 from being damaged when the mobile terminal 100 is abnormally squeezed.

In a preferred embodiment of the present disclosure, a line connecting the center point of the through hole 311 and the center point of the antenna unit 411 is perpendicular to the antenna unit 411, thereby further reducing a signal loss caused by the signal channel 321, and further improving the quality of transmitting and receiving signals of the antenna module 40.

In a preferred embodiment of the present disclosure, the signal channel 321 is not filled with any filler, so as to avoid a signal loss caused by the filler, improving the quality of transmitting and receiving signals of the antenna module 40.

Referring to FIG. 11, the internal support unit 30 includes a frame 341, and two side support bars 361. The two side support bars 361 are arranged symmetrically, and the frame 341 is provided between the rear shell 50 and the display screen 20 to provide better support between the display screen 20 and the rear shell 50 of the mobile terminal 100. The side support bars 361 are located at a side of the frame 341 away from the display screen 20 for providing support for the frame 341 and other components, ensuring that relative positions of the frame 341 and the other components are fixed, and thus avoiding deformation of the mobile terminal 100 due to an external force. It can be understood that, according to the function of the mobile terminal 100, the internal support unit 30 further includes other parts such as a part for fixing and supporting the camera, a part for fixing and supporting the battery, a part for fixing and supporting the microphone, etc., which are not specifically limited herein.

The through hole 311 is defined in the frame 341 and the side support bars 361, thereby forming the signal channel 321 without obstruction between the antenna module 40 and the side of the internal support unit 30 closest to the rear shell 50. It can be understood that, if parts of the other fixing and supporting components of the internal support unit 30 are located in the signal channel 321, the through hole 311 may extend through that parts in the signal channel 321 to avoid signal loss.

The internal support unit 30 is made of plastic. It can be understood that the internal support unit 30 can also be made of other materials. The internal support unit 30 is manufactured by injection molding or 3D printing. It can be understood that the internal support unit 30 can also be made by other processes. Each part of the internal support unit 30 is integrally formed, and these parts are then assembled to form the internal support unit 30 for fixing and supporting components of the mobile terminal 100. The components of the mobile terminal 100 are installed in the cavity of the mobile terminal 100 by snap-fit connection, adhesive bonding, etc.

The rear shell 50 is made of 3D glass, plastics, etc., which is not specifically limited herein.

Figure 13:
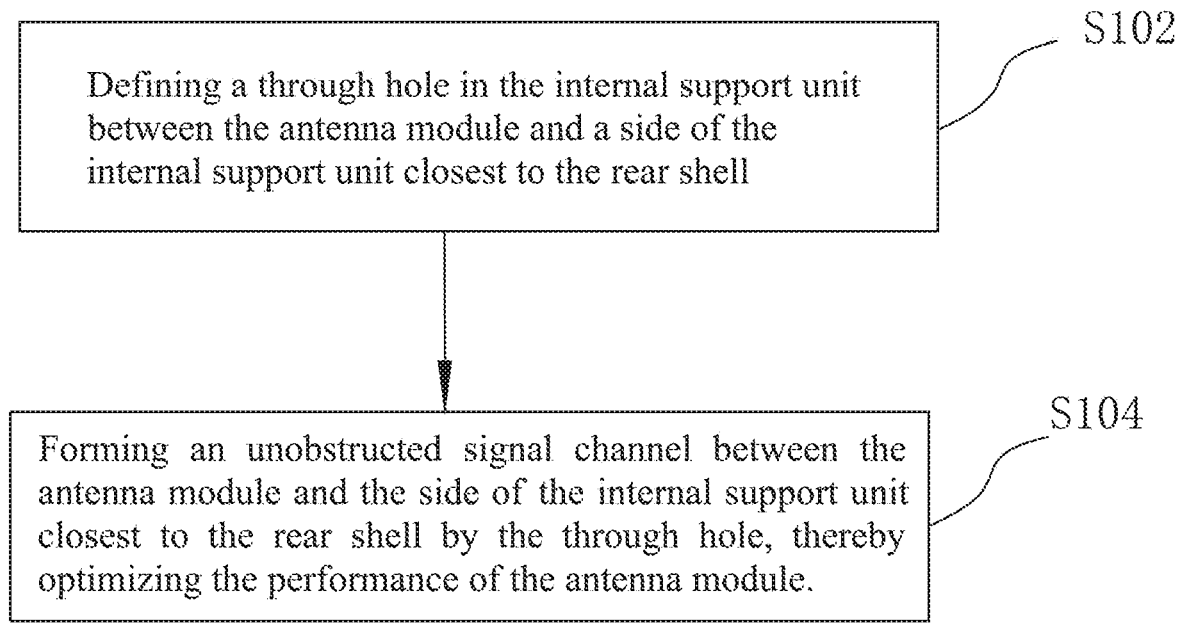
FIG. 13 is a flow chart of a method for optimizing a performance of an antenna module of the mobile terminal of the present disclosure.

As shown in FIG. 13, an embodiment of the present disclosure provides a method for optimizing a performance of the antenna module of the mobile terminal, including:

S102, defining a through hole in the internal support unit between the antenna module and the side closest to the rear shell; and S104, forming an unobstructed signal channel between the antenna module and the side closest to the rear shell by the through hole, optimizing the performance of the antenna module.

The shape of the through hole 311 may be any one of rectangle, square, and circle. It can be understood that the through hole 311 may also have other shapes, which is not specifically limited herein.

Figure 3:
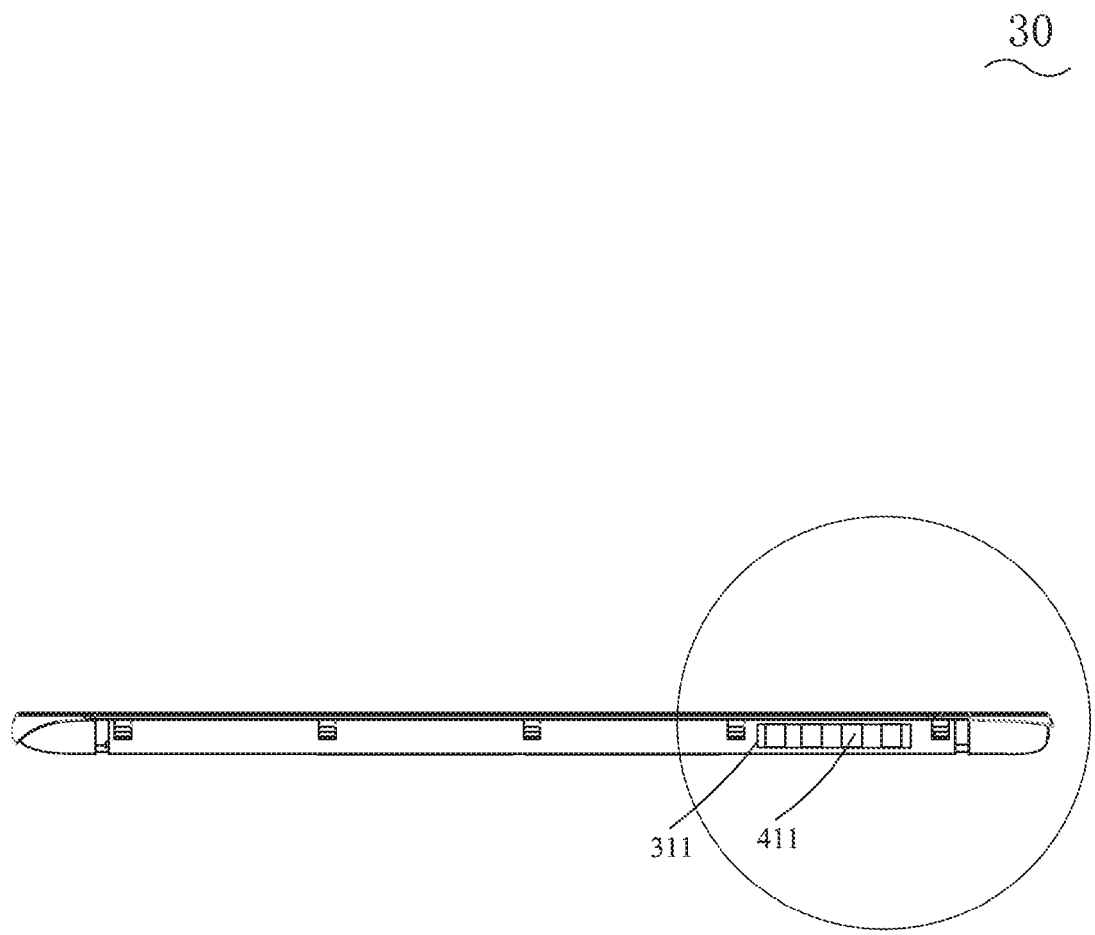
FIG. 3 is a schematic diagram showing one rectangular through hole defined in an internal support unit of the mobile terminal of the present disclosure.
Figure 4:
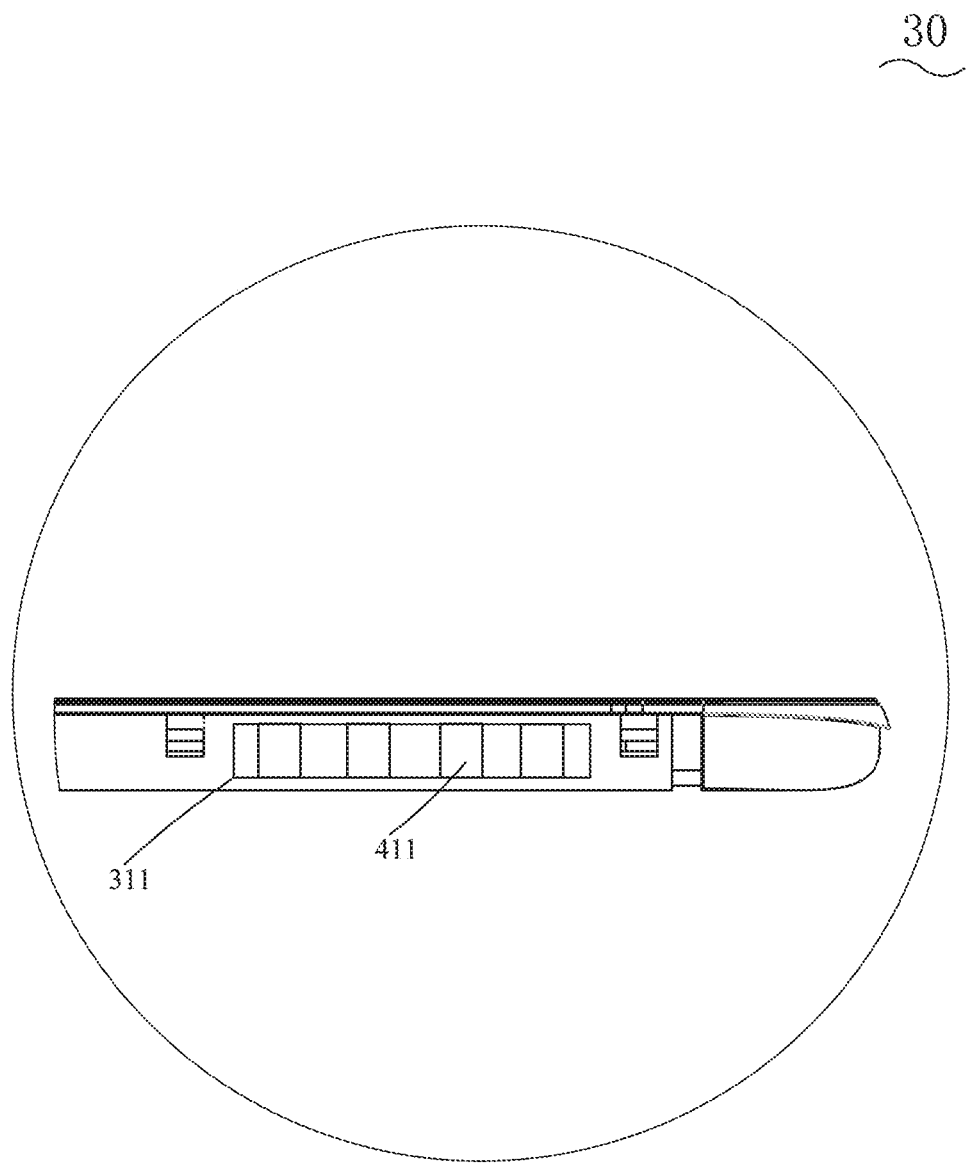
FIG. 4 is an enlarged view of a circled portion of FIG. 3.
Figure 5:
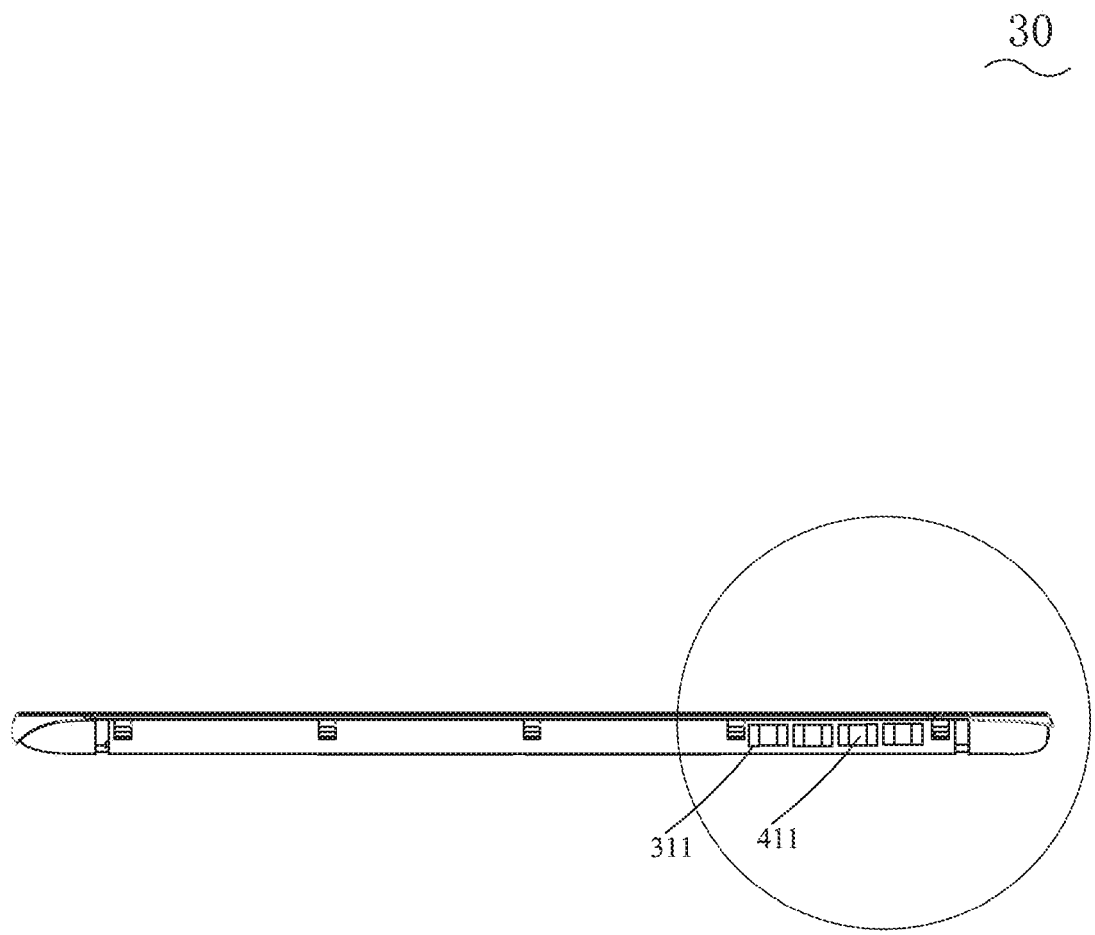
FIG. 5 is a schematic diagram showing rectangular through holes defined in the internal support unit of the mobile terminal of the present disclosure.
Figure 6:
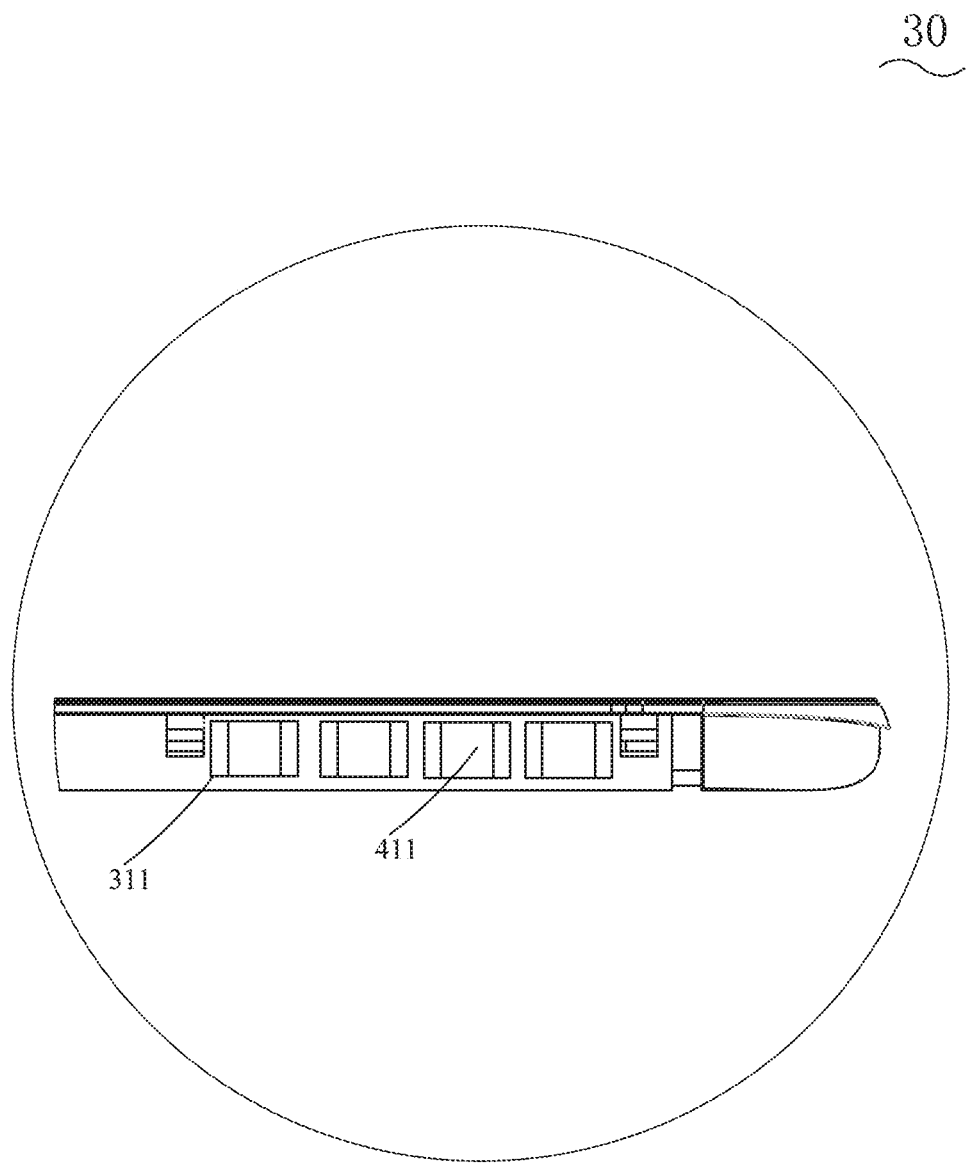
FIG. 6 is an enlarged view of a circled portion of FIG. 5.
Figure 7:
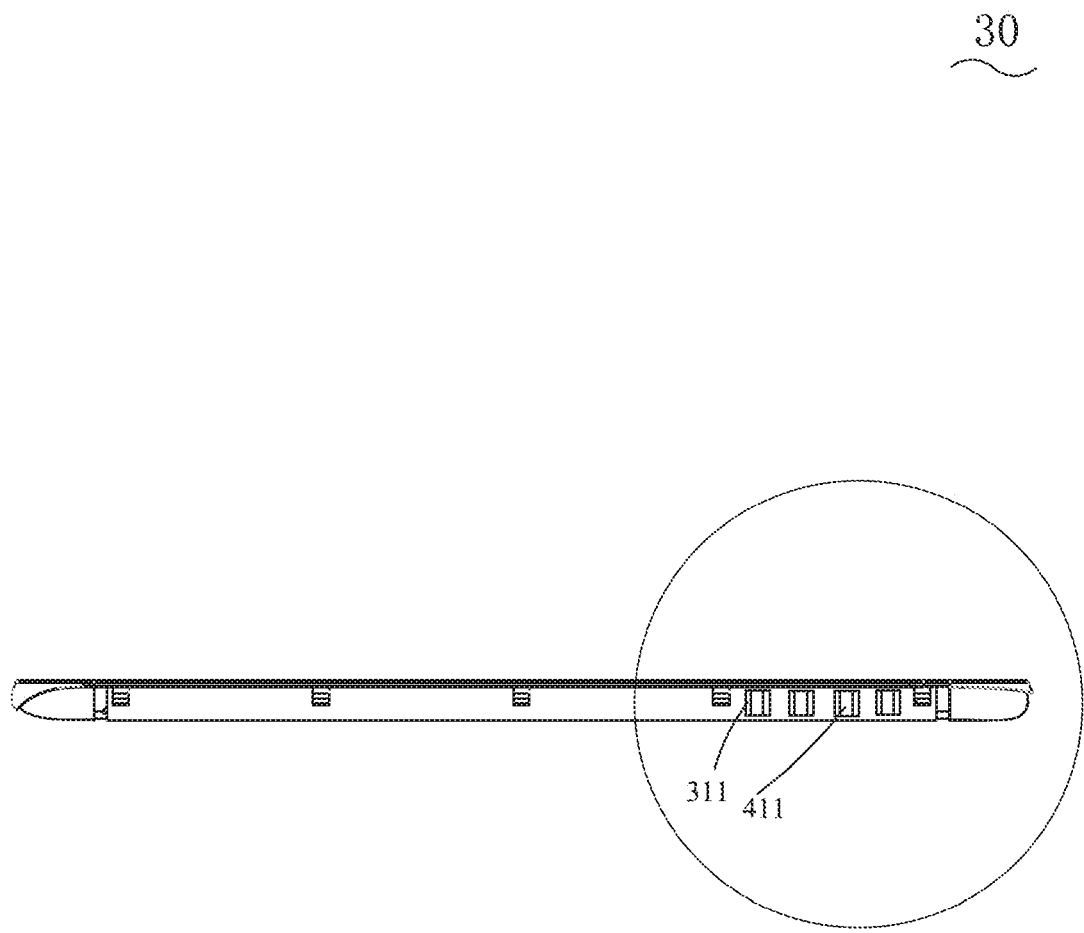
FIG. 7 is a schematic diagram showing square through holes defined in the internal support unit of the mobile terminal of the present disclosure.
Figure 8:
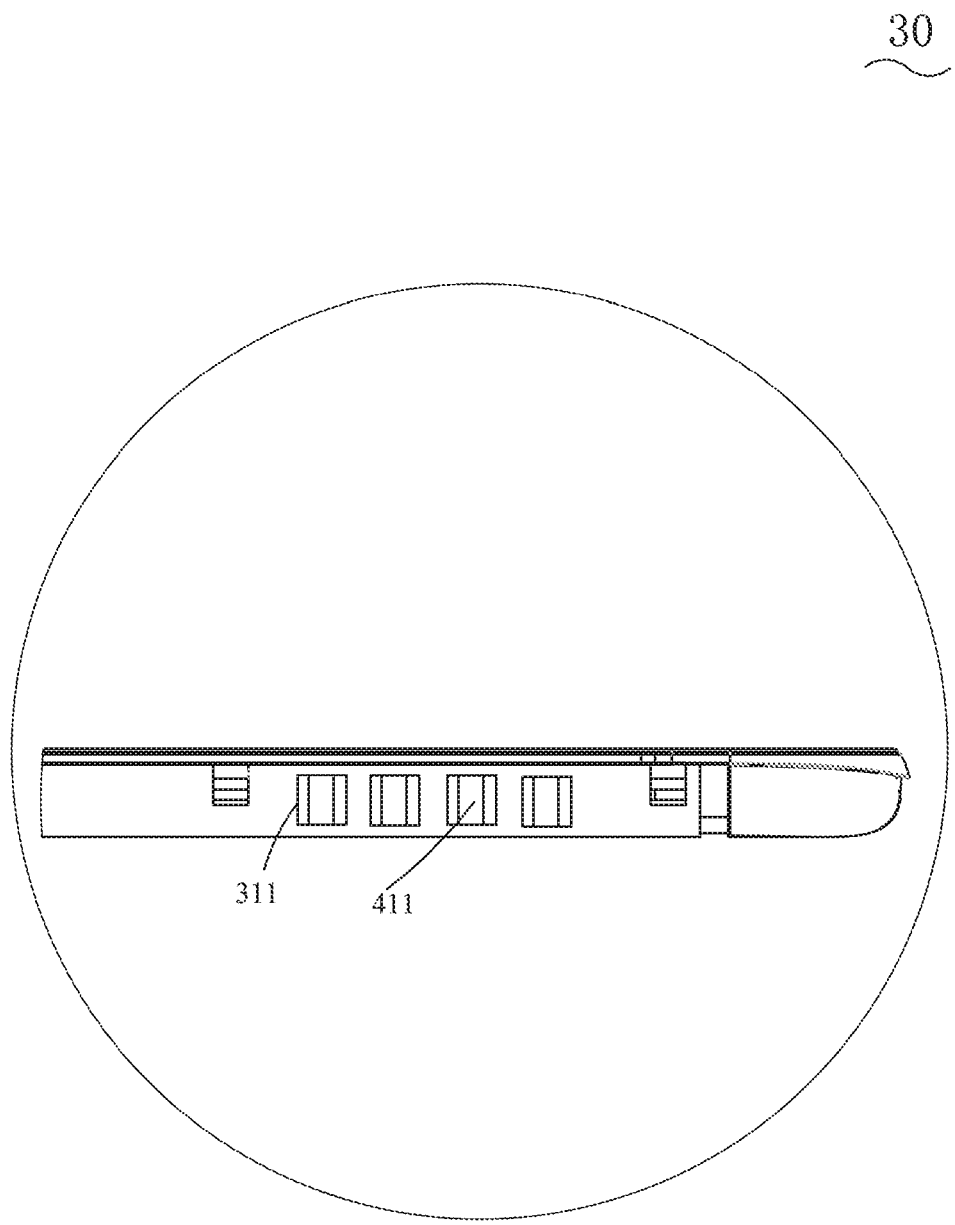
FIG. 8 is an enlarged view of a circled portion of FIG. 7.
Figure 9:
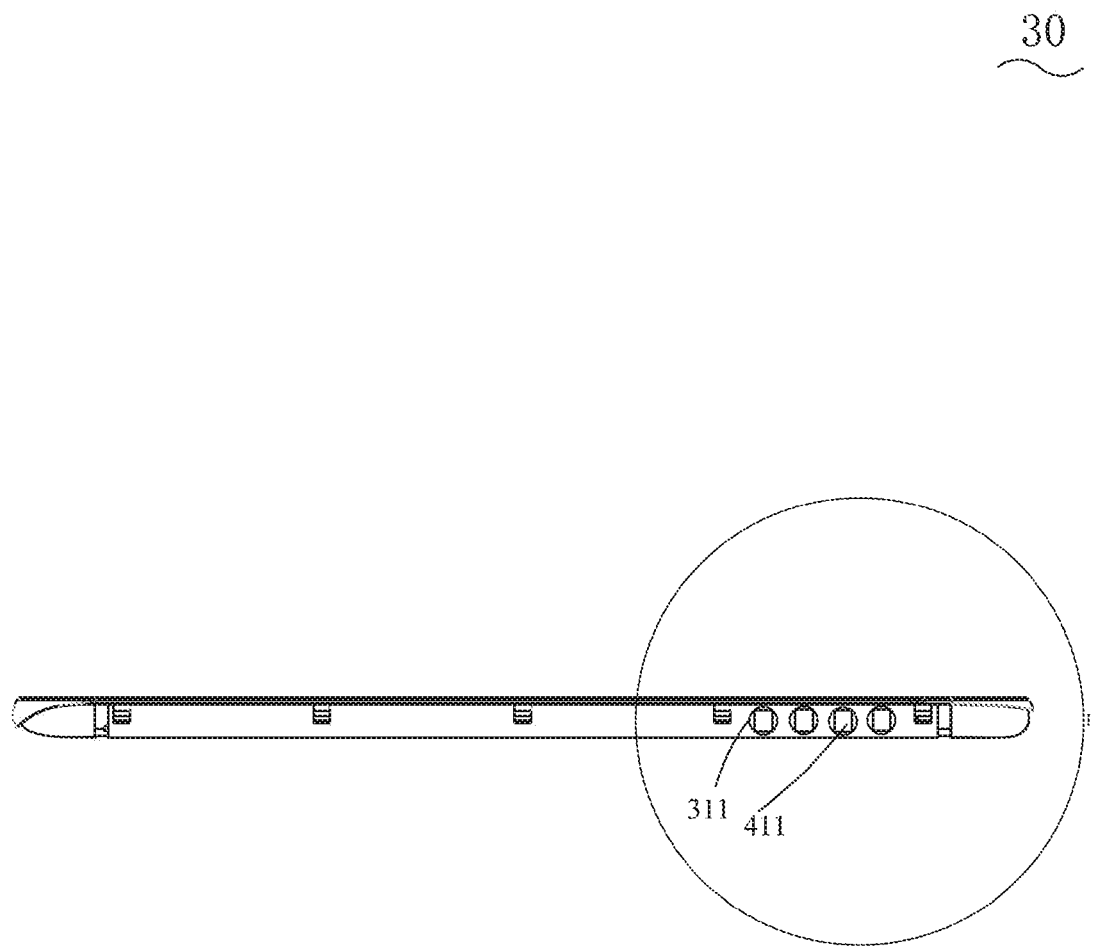
FIG. 9 is a schematic diagram showing circular through holes defined in the internal support unit of the mobile terminal of the present disclosure.
Figure 10:
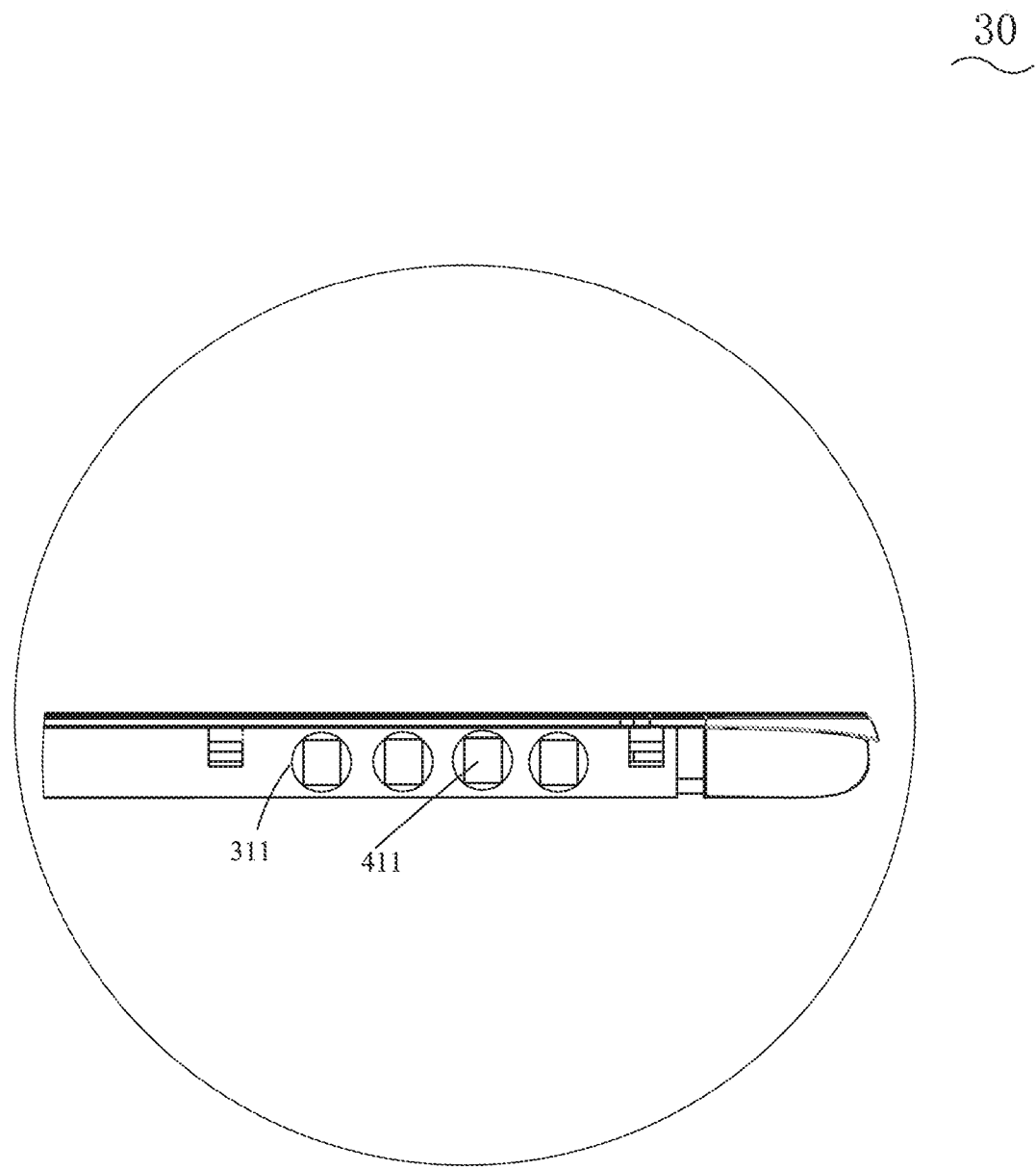
FIG. 10 is an enlarged view of a circled portion of FIG. 9.

As shown in FIG. 5 to FIG. 10, the antenna module 40 includes at least one antenna unit 411. The through hole 311 and the signal channel 321 correspond to the antenna unit 411 one to one, thereby ensuring the stability of transmitting and receiving signals of each antenna unit 411, improving the quality of transmitting and receiving signals of the antenna module 40. It can be understood that, in another embodiment, as shown in FIG. 3 and FIG. 4, one rectangular shaped through hole 311 and one signal channel 321 correspond to multi antenna units 411, or, multi\ through holes 311 and multi signal channels 321 correspond to multi antenna modules 411.

Specifically, an area between the antenna module 40 and the side closest to the rear shell 50 is a radiation zone of the antenna module 40. By providing the through hole 311 in the portion of the internal support unit 30 corresponding to the radiation zone to form the signal channel 321 without obstruction, the structure of the internal support unit 30 is optimized to thereby optimize the performance of the antenna module of the mobile terminal 100, realizing a broadband phased array module with better spatial coverage in a limited space, optimizing the direction of the antenna module 40, improving the gain and coverage of the antenna module 40, and optimizing the CDF index.

Figure 14:
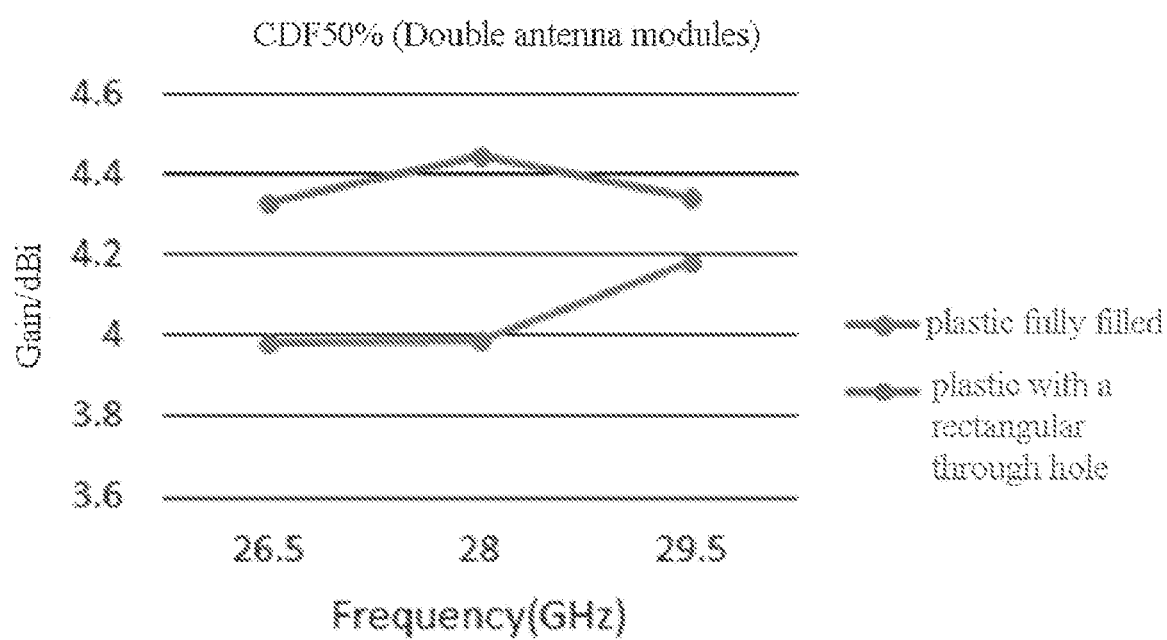
FIG. 14 is a diagram of gain curves of the antenna module, in case of double antenna modules applied in the mobile terminal of the present disclosure and the CDF of 50%.
Figure 15:
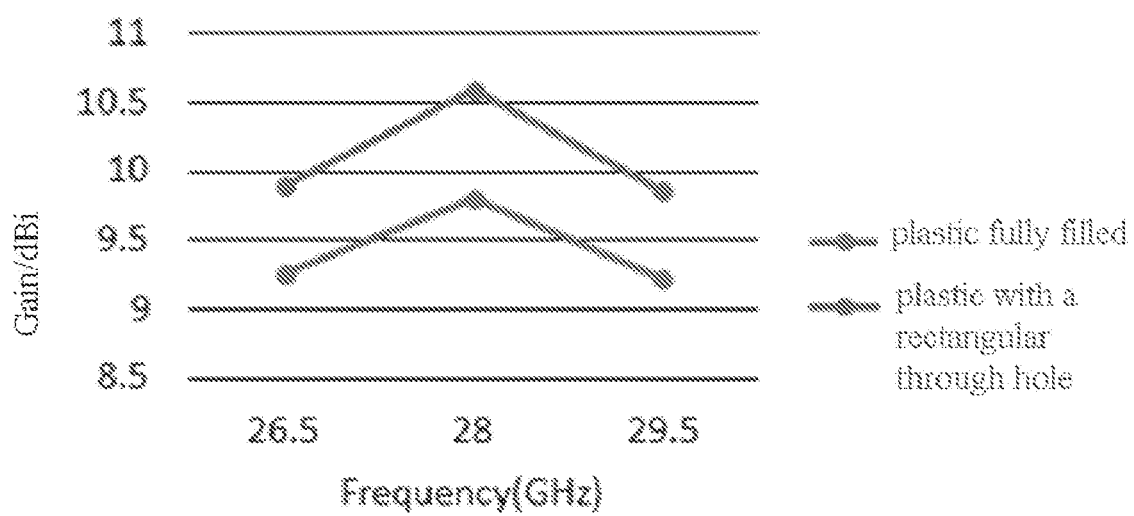
FIG. 15 is a diagram of gain comparative curves of the antenna module, in case of single antenna module applied in the mobile terminal of the present disclosure.

FIG. 14 is a diagram of gain curves of the antenna module, in case of double antenna modules and the CDF of 50%, including comparison between the rear shell made of plastic which is fully filled and the rear shell made of plastic with a rectangular through hole 311. FIG. 15 is a diagram of gain comparative curves, in case of single antenna module, including comparison between the rear shell made of plastic fully filled and the rear shell made of plastic with a rectangular through hole 311. It can be seen from the two diagrams that: in case of double antenna modules and the CDF of 50%, the optimized internal support unit 30 made of plastic with a rectangular through hole 311 forms the signal channel 321 between the antenna module 40 and the rear shell 50 without obstruction for improving signal transmission, and the internal support unit 30 still has good support performance.

The above are only embodiments of the present disclosure. It should be noted that those of ordinary skill in the art can make improvements without departing from the inventive concept of the present disclosure, but these improvements should be within the protection scope of the present disclosure.

What is claimed is:

1. A mobile terminal comprising:
   a rear shell comprises a rear wall and lateral walls located at four edges of the rear wall; the lateral walls are located at the same side of the rear wall, so that the rear shell forms a chamber with an opening opposite to the rear wall;
   a display screen, the display screen cooperating with the rear shell to form a cavity therebetween;
   an internal support unit being located in the cavity for fixing and supporting components of the mobile terminal; the internal support unit comprises a frame provided between the rear shell and the display screen, side support bars located at a side of the frame away from the display screen; and
   an antenna module being located in the cavity and at a position close to a lateral wall of the rear shell and being fixed and supported by the internal support unit; the antenna module is close to a top short side of the mobile terminal opposite to the bottom short side and is parallel to a long side of the mobile terminal;
   wherein the internal support unit defines a through hole in the frame and the side support bars for forming an unobstructed signal channel between the antenna module and a side of the internal support unit closest to the rear shell, the antenna module comprises at least one antenna unit, and the through hole and the signal channel correspond to the antenna unit one to one.

2. The mobile terminal of claim 1, wherein the at least one antenna unit comprises a plurality of antenna units, the internal support unit defines a plurality of through holes to form a plurality of signal channels, each of the antenna units corresponds to one of the signal channels.

3. The mobile terminal of claim 2, wherein the internal support unit comprises a protrusion formed between adjacent two signal channels, the protrusion extending toward the display screen.

4. The mobile terminal of claim 3, wherein a top surface of the protrusion is spaced from the display screen when the mobile terminal is in normal use.

5. The mobile terminal of claim 1, wherein a line connecting a center of the through hole and a center of the antenna unit is perpendicular to the antenna unit.

6. The mobile terminal of claim 1, wherein a shape of the through hole is one of rectangle, square and circle.

7. The mobile terminal of claim 1, wherein the internal support unit is made of plastic.

8. The mobile terminal of claim 7, wherein the internal support unit is manufactured by injection molding or 3D printing.

9. The mobile terminal of claim 7, wherein the signal channel is hollow without any filler.

10. The mobile terminal of claim 7, wherein the rear shell is made of 3D glass.

11. The mobile terminal of claim 1, wherein the rear shell comprises a rear wall and the lateral wall which extends from a periphery of the rear wall.

12. The mobile terminal of claim 1, wherein the rear shell comprises a pair of long sides and a pair of short sides connected between the long sides, and the antenna module is parallel to the long sides.

13. A method for optimizing a performance of an antenna module of a mobile terminal, the mobile terminal comprising the antenna module, a display screen, a rear shell comprises a rear wall and lateral walls located at four edges of the rear wall; the lateral walls are located at the same side of the rear wall, so that the rear shell forms a chamber with an opening opposite to the rear wall, and an internal support unit comprises a frame provided between the rear shell and the display screen, side support bars located at a side of the frame away from the display screen, the method comprising steps:
   defining a through hole in the internal support unit between the antenna module and a side of the internal support unit closest to the rear shell; and
   forming an unobstructed signal channel between the antenna module and the side of the internal support unit closest to the rear shell by the through hole, the antenna module comprises at least one antenna unit, and the through hole and the signal channel correspond to the antenna unit one to one, thereby optimizing the performance of the antenna module.

* * * * *